US 9,593,580 B2

(12) United States Patent
Gauvreau et al.

(10) Patent No.: US 9,593,580 B2
(45) Date of Patent: Mar. 14, 2017

(54) WANKEL ENGINE ROTOR

(71) Applicant: Pratt & Whitney Canada Corp., Longueuil (CA)

(72) Inventors: Jean-Gabriel Gauvreau, Contrecoeur (CA); David Gagnon-Martin, Longueuil (CA)

(73) Assignee: PRATT & WHITNEY CANADA CORP., Longueuil, Quebec (CA)

( * ) Notice: Subject to any disclaimer, the term of this patent is extended or adjusted under 35 U.S.C. 154(b) by 82 days.

(21) Appl. No.: 13/684,390

(22) Filed: Nov. 23, 2012

(65) Prior Publication Data
US 2014/0147320 A1    May 29, 2014

(51) Int. Cl.
| F01C 1/00 | (2006.01) |
| F01C 1/22 | (2006.01) |
| F01C 21/08 | (2006.01) |
| F02B 55/02 | (2006.01) |
| F02B 53/00 | (2006.01) |

(52) U.S. Cl.
CPC ............... *F01C 1/00* (2013.01); *F01C 1/22* (2013.01); *F01C 21/08* (2013.01); *F02B 55/02* (2013.01); *F02B 2053/005* (2013.01); *Y02T 10/17* (2013.01)

(58) Field of Classification Search
CPC ........... F01C 21/08; F02B 55/02; Y02T 10/17
USPC ....... 123/218, 200, 205, 207, 208, 209, 210, 123/212, 214, 231, 243; 418/1, 61.2
See application file for complete search history.

(56) References Cited

U.S. PATENT DOCUMENTS

| 3,059,585 | A | * | 10/1962 | Froede et al. ................ 418/1 |
| 3,102,682 | A | * | 9/1963 | Paschke ...................... 418/61.2 |
| 3,176,915 | A | * | 4/1965 | Bentele et al. ............. 418/61.2 |
| 3,204,614 | A | * | 9/1965 | Huber ............................ 418/94 |
| 3,206,109 | A | * | 9/1965 | Paschke ...................... 418/61.2 |
| 3,358,652 | A | | 12/1967 | Lawrence |
| 3,400,604 | A | * | 9/1968 | Jones ............................ 74/433 |
| 3,400,939 | A | * | 9/1968 | Jones ............................ 277/357 |
| 3,444,842 | A | * | 5/1969 | Bensinger et al. ............. 418/91 |
| 3,445,058 | A | * | 5/1969 | Bensinger .................... 418/61.2 |
| 3,469,505 | A | * | 9/1969 | Bensinger ..................... 92/177 |
| 3,655,302 | A | * | 4/1972 | Hermes et al. .............. 418/61.2 |
| 3,762,377 | A | * | 10/1973 | Anthony et al. ............. 123/211 |
| 3,799,706 | A | * | 3/1974 | Bilobran ...................... 418/61.2 |

(Continued)

FOREIGN PATENT DOCUMENTS

| EP | 2497902 | 9/2012 |
| GB | 1459039 | 12/1976 |
| JP | S54117808 | 9/1979 |

*Primary Examiner* — Nicholas J Weiss
*Assistant Examiner* — Jason T Newton
(74) *Attorney, Agent, or Firm* — Norton Rose Fulbright Canada

(57) ABSTRACT

A rotor for a Wankel engine including a plurality of ribs extending from a bearing support to each one of the flanks, the plurality of ribs including, for each flank, first and second ribs connected to the flank between the recess and a respective one of the apex portions. The first and second ribs are curved along at least a portion thereof, and/or the first and second ribs are closest to the respective apex portion and connected to the flank adjacent a junction between a portion of the flank defining the recess and a respective portion of the flank connected thereto. A method of reducing pinching of apex seals in a rotor of a Wankel engine is also discussed.

19 Claims, 4 Drawing Sheets

(56) References Cited

U.S. PATENT DOCUMENTS

| | | | | |
|---|---|---|---|---|
| 3,847,517 A | * | 11/1974 | Hermes et al. | 418/91 |
| 3,891,357 A | | 6/1975 | Davis et al. | |
| 3,920,358 A | * | 11/1975 | Wieland | 418/61.2 |
| 3,942,918 A | * | 3/1976 | Hermes | 418/61.2 |
| 3,964,445 A | | 6/1976 | Ernest et al. | |
| 3,969,049 A | * | 7/1976 | Hermes | F01C 1/22 418/142 |
| 3,974,309 A | * | 8/1976 | Uy | 427/250 |
| 3,988,079 A | * | 10/1976 | Ounsted et al. | 418/61.2 |
| 4,102,616 A | * | 7/1978 | Ishikawa | 418/91 |
| 4,125,347 A | | 11/1978 | Kakui | |
| 4,793,304 A | * | 12/1988 | Eiermann | 123/205 |
| 6,481,989 B2 | | 11/2002 | Eiermann | |
| 7,500,461 B2 | * | 3/2009 | Baier et al. | 123/205 |
| 2005/0276704 A1 | | 12/2005 | Baier et al. | |
| 2012/0227397 A1 | | 9/2012 | Willi et al. | |

\* cited by examiner

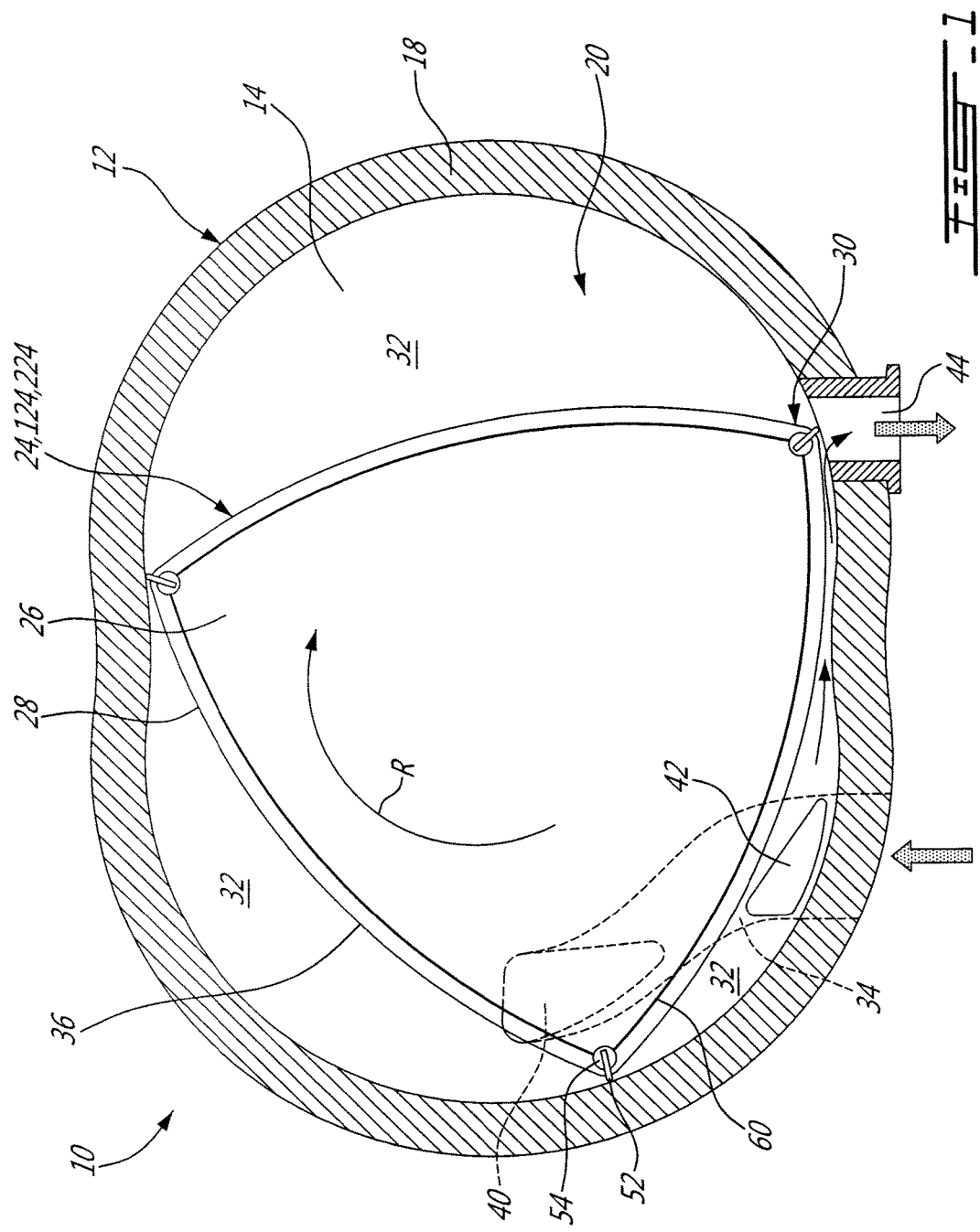

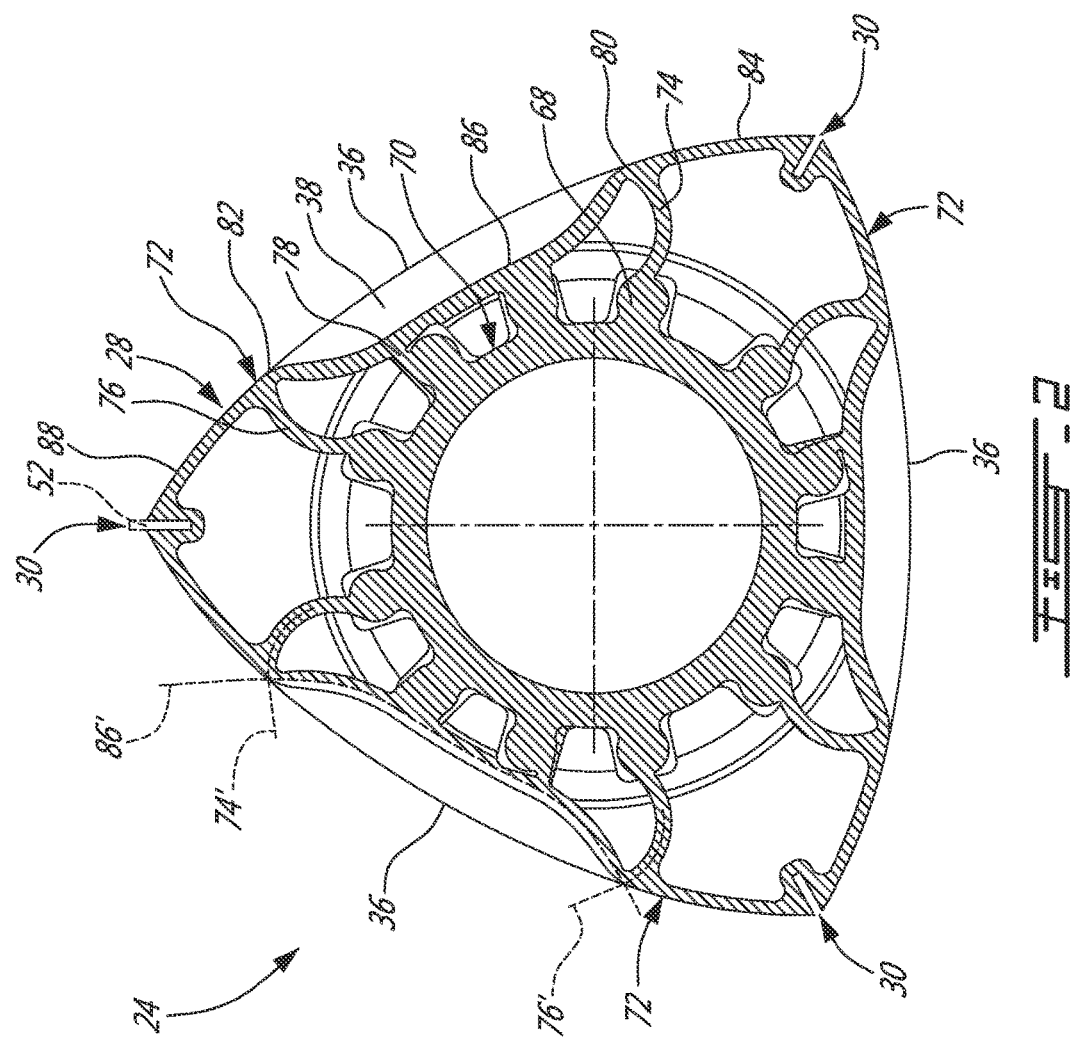

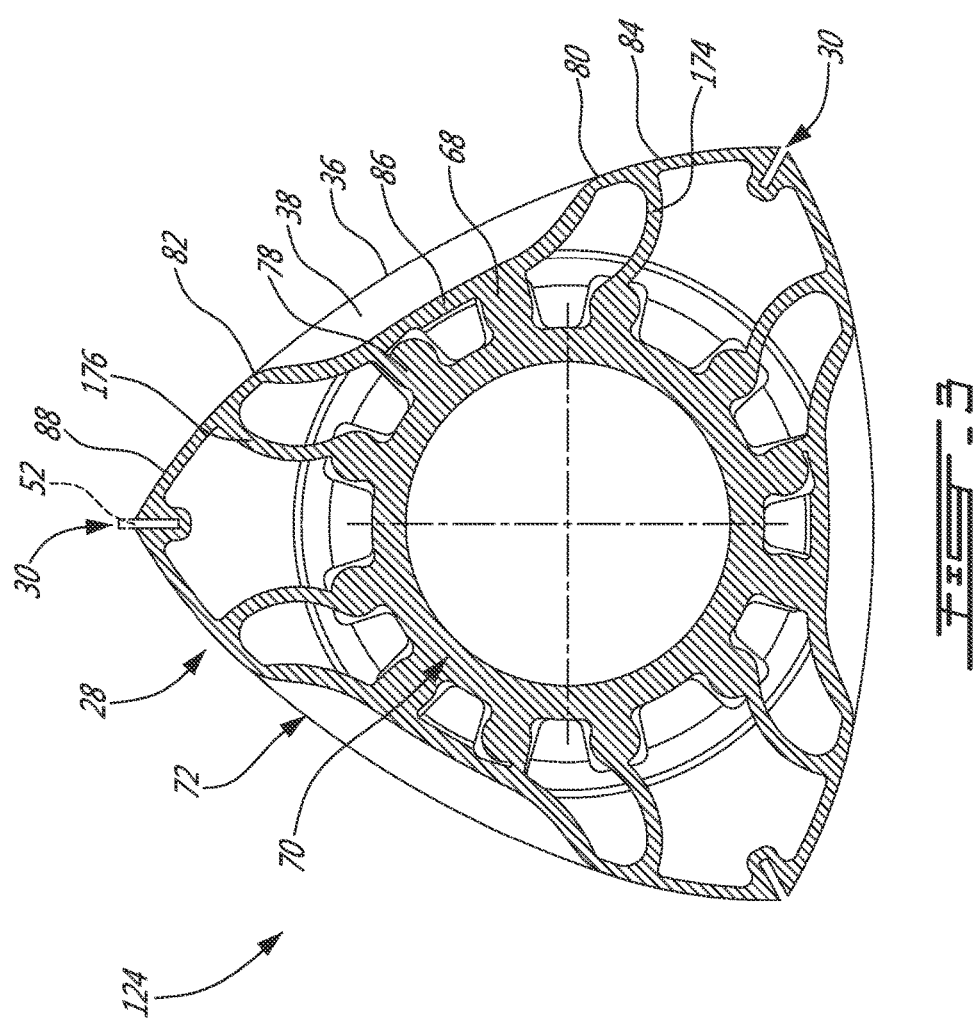

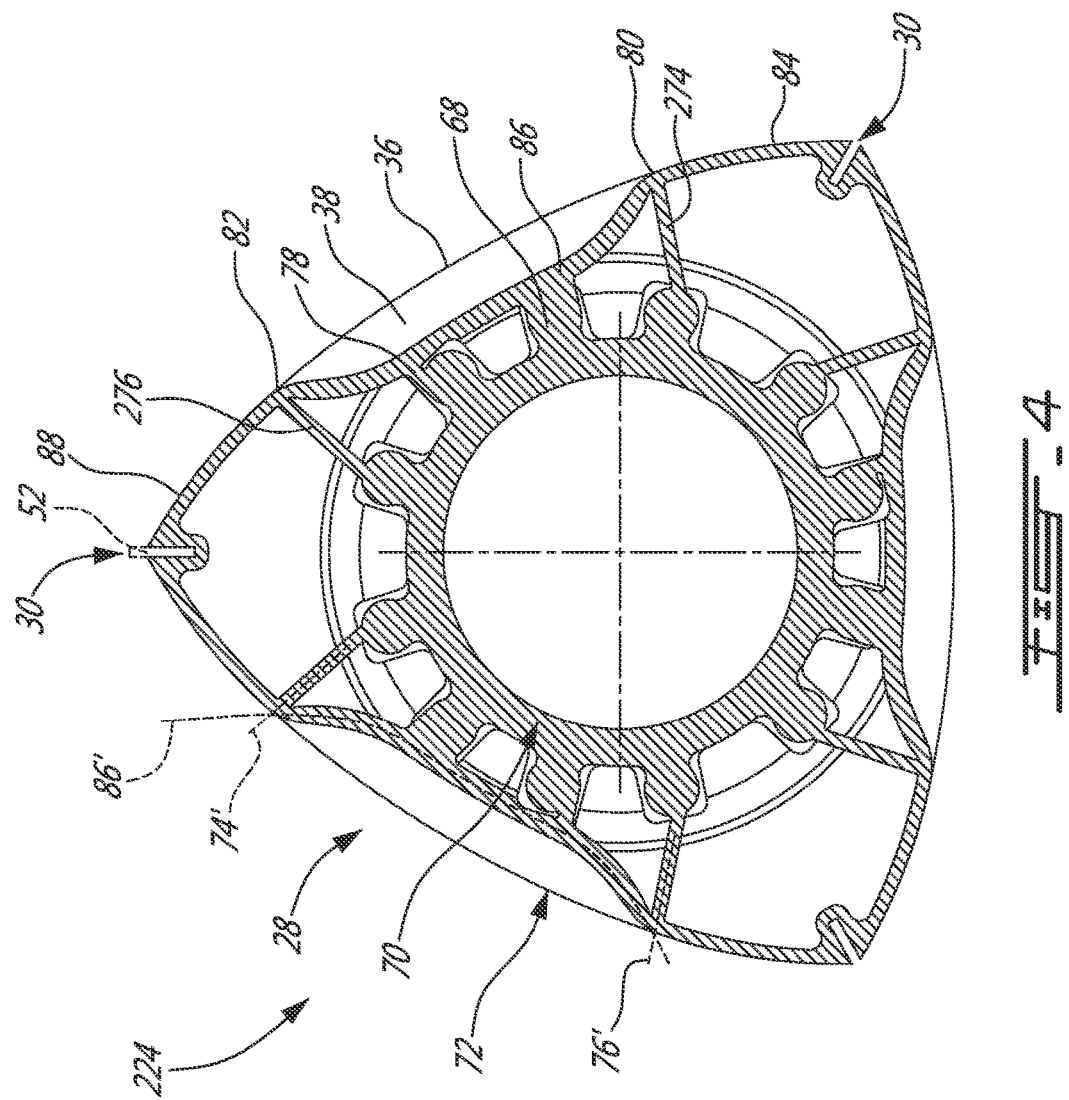

WANKEL ENGINE ROTOR

TECHNICAL FIELD

The application relates generally to rotary internal combustion engines and, more particularly, to Wankel engine rotors.

BACKGROUND OF THE ART

Wankel engine rotors may include straight radial ribs extending between the flanks and bearing support, such as to provide adequate stiffness while minimizing the rotor weight. However, particularly under high power which simultaneously imparts high thermal load on the rotor flanks and high structural loads on the bearing, the ribs may pull on the bearing support, which may cause it to deform and adversely impact the bearing load-carrying capacity. Moreover, the expansion of the flanks caused by the high temperature may produce an undesirable pinching of the apex seals.

SUMMARY

In one aspect, there is provided a rotor for a Wankel engine comprising: two axially spaced apart end faces having a generally triangular profile with outwardly arched sides and three circumferentially spaced apex portions; a peripheral face extending between the end faces and defining three flanks, each flank extending between two of the apex portions, each flank having: a recess portion defining a recess with respect to the corresponding one of the arched sides to form part of a combustion chamber, the recess portion extending from a leading end to a trailing end of the recess, a leading portion extending along the corresponding one of the arched sides from one of the apex portions to the recess portion at the leading end, and a trailing portion extending along the corresponding one of the arched sides from the recess portion at the trailing end to another one of the apex portions; a bearing support extending between the end faces to support a rotor bearing, the bearing support having a central axis corresponding to a central axis of the rotor; and a plurality of ribs extending between the end faces from the bearing support to each one of the flanks, the plurality of ribs including, for each flank, a first rib closest to the one of the apex portions and a second rib closest to the other one of the apex portions, the first rib being connected to the flank adjacent a junction between the leading and recess portions and the second rib being connected to the flank adjacent a junction between the recess and leading portions.

In another aspect, there is provided a rotor for a Wankel engine comprising: two axially spaced apart end faces having a generally triangular profile with outwardly arched sides and three circumferentially spaced apex portions; a peripheral face extending between the end faces and defining three flanks, each flank extending between two corresponding ones of the apex portions, each flank including a recess in the peripheral face defining part of a combustion chamber; a support structure extending between the end faces to support a rotor bearing, the bearing support having a central axis corresponding to a central axis of the rotor; and a plurality of ribs extending between the end faces from the bearing support to each one of the flanks, the plurality of ribs including, for each flank, a first rib connected to the flank between the recess and one of the corresponding apex portions and a second rib connected to the flank between the recess and the other corresponding one of the apex portions, at least a portion of the first and second ribs of each flank being curved when viewed in a plane perpendicular to the central axis of the rotor.

In a further aspect, there is provided a method of reducing pinching of apex seals in a rotor of a Wankel engine having a generally triangular profile with outwardly arched sides defining three flanks each including a recess defining part of a combustion chamber and three circumferentially spaced apex portions interconnecting the flanks, the method comprising: interconnecting each of the flanks to a bearing support having a central axis corresponding to a central axis of the rotor with a first rib closest to one of the apex portions and connected to the flank adjacent a leading end of the recess defined therein; and interconnecting each of the flanks to the bearing support with a second rib closest to another one of the apex portions and connected to the flank adjacent a trailing end of the recess defined therein.

DESCRIPTION OF THE DRAWINGS

Reference is now made to the accompanying figures in which:

FIG. 1 is a schematic cross-sectional view of a rotary internal combustion engine in accordance with a particular embodiment;

FIG. 2 is a schematic cross-sectional view of a rotor of the rotary internal combustion engine of FIG. 1 in accordance with a particular embodiment;

FIG. 3 is a schematic cross-sectional view of a rotor of the rotary internal combustion engine of FIG. 1 in accordance with another particular embodiment; and FIG. 4 is a schematic cross-sectional view of a rotor of the rotary internal combustion engine of FIG. 1 in accordance with another particular embodiment.

DETAILED DESCRIPTION

Referring to FIG. 1, a rotary internal combustion engine 10 known as a Wankel engine is schematically shown. The rotary engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24, 124, 224 is received within the cavity 20. The rotor 24, 124, 224 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24, 124, 224 and outer body 12. The geometrical axis of the rotor 24, 124, 224 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24, 124, 224 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent end wall 14. Alternate sealing arrangements are also possible.

Although not shown in the Figures, the rotor 24, 124, 224 is journaled on an eccentric portion of a shaft such that the shaft rotates the rotor 24, 124, 224 to perform orbital revolutions within the stator cavity 20. The shaft rotates three times for each complete rotation of the rotor 24, 124, 224 as it moves around the stator cavity 20. Oil seals are provided around the eccentric to impede leakage flow of lubricating oil radially outwardly thereof between the respective rotor end face 26 and outer body end wall 14. During each rotation of the rotor 24, 124, 224, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the end wall 14 of in the peripheral wall 18. In the embodiment shown, the inlet port 40 and purge port 42 are defined in the end wall 14 and communicate with a same intake duct 34 defined as a channel in the end wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring to FIG. 2, a central cross-section of the rotor 24 according to a particular embodiment is shown, taken along a plane perpendicular to its central axis. The rotor 24 includes a bearing support 70, which in the embodiment shown is tubular, extending between the end faces 26 to support a rotor bearing (not shown) to engage the rotor 24 to the shaft eccentric. The axis of the bearing support 70 corresponds to the central axis of the rotor 24.

The peripheral face 28 defines three flanks 72 with each flank 72 extending between two of the apex portions 30. Each flank 72 includes a recess 38 which defines part of the volume of the corresponding chamber 32. A plurality of ribs 74, 76, 78 interconnects the flanks 72 to the bearing support 70. The end faces 26 are engaged to the bearing support 70, ribs 74, 76, 78 and flanks 72.

The plurality of ribs include, for each flank 72, a first rib 74 which is closest to one of the apex portions 30 to which the flank 72 is connected and a second rib 76 which is closest to the other of the apex portions 30 to which the flank 72 is connected. In a particular embodiment, for each flank 72, at least one intermediate rib 78 is provided between the first and second ribs 74, 76. In the embodiment shown, each flank 72 includes two intermediate ribs 78 between the first and second ribs 74, 76. In another embodiment, more or less than two intermediate ribs may be provided for each flank.

In the embodiment shown, the base of each rib 74, 76, 78 is defined by a boss 68 extending from the outer surface of the bearing support 70. In the embodiment shown, the boss 68 forms a base portion substantially larger than a remainder of the first and second ribs 74, 76, while the intermediate ribs 78 are defined completely or almost completely by their respective boss 68. In another embodiment, the intermediate ribs 78 also include a thinner portion extending from the respective boss 68 to the flank 72. In another embodiment, the bosses 68 are omitted, i.e. the ribs 74, 76, 78 have a substantially constant cross-section from the bearing support 70 to the corresponding flank 72.

In the embodiment shown, the bosses 68 of the ribs 74, 76, 78 connected to a same flank 72 are regularly circumferentially spaced apart, with a greater distance being defined between the bosses 68 of the ribs 74, 76 connected to different flanks 72. In another embodiment, all the bosses 68 may be regularly circumferentially spaced apart from one another, or the distances between bosses 68 of the ribs 74, 76, 78 connected to a same flank 72 may vary. In the embodiment shown, each recess 38 is defined symmetrically about the center of the respective flank 72. Alternately, each recess 38 may be asymmetrical, with its leading end and trailing end having different shapes, and the distance between the ribs 74, 76, 78 of a same flank 72 may vary. However, the rib structure and pattern of each flank 72 are the same as that of the other flanks 72.

It can be seen that the thinner portion of the first and second ribs 74, 76 is curved as viewed in the plane of FIG. 2. In the embodiment shown, the first and second ribs 74, 76 are curved along their entire length with the exception of the bosses 68. In another embodiment, the first and second ribs 74, 76 may be curved along their entire length. In yet another embodiment, the portion of the first and second ribs 74, 76 which is curved may be smaller than the portion shown, with the uncurved portion including the boss 68, being completely defined by the boss 68, or with the boss 68 being omitted.

In the embodiment shown, the first and second ribs 74, 76 of the same flank 72 are curved in opposite directions, such that their concave sides face one another; as such, the ribs nearest each apex and on each side thereof are curved in opposite directions, with their convex sides facing one another. The curved portion of the first and second ribs 74, 76 extends along, or substantially along, a corresponding arc of circle. Alternate configurations for curved ribs are also possible, for example ribs with parabolic or other variable curvature shapes, including constant and non-constant curvatures; as such, in the present application, it is understood that "curved" is intended to include any shape departing from a straight line. In the embodiment shown, the intermediate ribs 78 are straight, but other shapes are also possible.

It can be also seen that for each flank 72, the first rib 74 is connected to the flank 72 adjacent a leading end 80 of the recess 38, and the second rib 76 is connected to the flank 72 adjacent a trailing end 82 of the recess 38, the leading end 80 being located in front of the trailing end 82 with respect to the direction of rotation R of the rotor (see FIG. 1). In other words, each flank 72 can be defined as including a recess portion 86 defining the recess 38 and extending from the leading end 80 to the trailing end 82, a leading portion 84 extending from one of the apex portions 30 to the recess portion 86 at the leading end 80 and following the corresponding arched side 36, and a trailing portion 88 extending from the recess portion 86 at the trailing end 82 to another one of the apex portions 30 and also following the arched side 36. The first rib 74 is connected to the flank 72 adjacent a junction between the leading and recess portions 84, 86, and the second rib 76 is connected to the flank 72 adjacent a junction between the recess and trailing portions 86, 88.

In the embodiment shown, the first rib 74 is connected to the flank 72 directly on the junction between the leading and recess portions 84, 86, and the second rib 76 is connected to the flank 72 directly on the junction between the recess and trailing portions 86, 88, so that along the cross-section shown in FIG. 2, the central line 74' of the first rib 74 and the central line 76' of the second rib 76 both intersect the central line 86' of the recess portion 86 of the flank 72 in substantial alignment or in alignment with the corresponding arched side 36. Other configurations are also possible.

In a particular embodiment, the minimization of the part of the flank 72 extending between the ends 80, 82 of the recess 38 and the respective one of the first and second ribs 74, 76 allows to minimize the part of the flank 72 between the recess 38 and each corresponding apex portions 30 along which the heat emanating from the recess 38 travels before the heat is directed along the ribs 74, 76. This in turn may reduce the thermal growth of the leading and trailing portions 84, 88 of the flank 72 thus reducing the pinching of the apex seal 52 which may result from such thermal growth, and/or reduce the temperature at the apex seal 52.

In a particular embodiment, the curvature of the first and second ribs 74, 76 provides flexibility along the radial direction to help reduce the thermal pull of the ribs 74, 76 on the bearing support 70 and the resulting thermal stresses, while still providing adequate support to the bearing.

Referring to FIG. 3, a central cross-section of the rotor 124 according to another particular embodiment is shown, taken along a plane perpendicular to its central axis. The elements of the rotor 124 of FIG. 3 which are identical or similar to the elements of the rotor 24 of FIG. 2 are identified by the same reference numerals and will not be further described herein.

In this embodiment, the first and second ribs 174, 176 are curved and are connected to the flank 72 in proximity of the leading end 80 and the trailing end 82 of the recess 38, respectively, while being spaced apart therefrom. The distance between each of the first and second ribs 174, 176 and the corresponding recess end 80, 82 is substantially smaller than the distance between each of the first and second ribs 174, 176 and the closest apex seal 52. In a particular embodiment, this configuration may be beneficial in terms of reduction of thermal stresses at the bearing support 70.

Referring to FIG. 4, a central cross-section of the rotor 224 according to another particular embodiment is shown, taken along a plane perpendicular to its central axis. The elements of the rotor 224 of FIG. 4 which are identical or similar to the elements of the rotors 24, 124 of FIGS. 2-3 are identified by the same reference numerals and will not be further described herein.

In this embodiment, the first and second ribs 274, 276 are straight and connected to the flank 72 adjacent the leading end 80 and the trailing end 82 of the recess 38, respectively, or adjacent and/or directly on the junction between the leading and recess portions 84, 86 and the junction between the recess and trailing portions 86, 88, respectively. In the embodiment shown, the first and second ribs 274, 276 are angled with respect to the radial direction. In an alternate embodiment, the first and second ribs 274, 276 extend radially. In a particular embodiment, this configuration may be beneficial in terms of reduction of the temperature at the apex seals 52 and pinching of the apex seals 52.

The above description is meant to be exemplary only, and one skilled in the art will recognize that changes may be made to the embodiments described without departing from the scope of the invention disclosed. For example, the first and second ribs may have different configurations from one another. Other modifications which fall within the scope of the present invention will be apparent to those skilled in the art, in light of a review of this disclosure, and such modifications are intended to fall within the appended claims.

The invention claimed is:

1. A rotor for a Wankel engine comprising:
   two axially spaced apart end faces having a generally triangular profile with outwardly arched sides and three circumferentially spaced apex portions;
   a peripheral face extending between the end faces and defining three flanks, each flank extending between two of the apex portions, each flank having:
     a recess portion defining a recess with respect to the corresponding one of the arched sides to form part of a combustion chamber, the recess portion extending from a leading end to a trailing end of the recess, the leading end being located in front of the trailing end with respect to a direction of rotation of the rotor,
     a leading portion extending along the corresponding one of the arched sides from one of the apex portions to the recess portion at the leading end, and
     a trailing portion extending along the corresponding one of the arched sides from the recess portion at the trailing end to another one of the apex portions;
   a bearing support extending between the end faces to support a rotor bearing, the bearing support having a central axis corresponding to a central axis of the rotor; and
   a plurality of ribs extending between the end faces from the bearing support to each one of the flanks, the plurality of ribs including, for each flank, a first rib closest to the one of the apex portions and a second rib closest to the other one of the apex portions, each of the apex portions being free of rib connections, the first rib of each flank being connected to the flank at a first junction between the leading and recess portions, and the second rib of each flank being connected to the flank at a second junction between the recess and trailing portions;
   wherein for each flank, a central line of the first rib intersects a central line of the recess portion at a first intersection, a central line of the second rib intersects the central line of the recess portion at a second intersection, both the first and second intersections being in alignment with a corresponding one of the arched sides when viewed in a plane perpendicular to the central axis of the rotor.

2. The rotor as defined in claim 1, wherein the first and second ribs are straight when viewed in a plane perpendicular to the central axis of the rotor.

3. A rotor for a Wankel engine comprising:
   two axially spaced apart end faces having a generally triangular profile with outwardly arched sides and three circumferentially spaced apex portions;
   a peripheral face extending between the end faces and defining three flanks, each flank extending between two of the apex portions, each flank having:
     a recess portion defining a recess with respect to the corresponding one of the arched sides to form part of a combustion chamber, the recess portion extending from a leading end to a trailing end of the recess, the leading end being located in front of the trailing end with respect to a direction of rotation of the rotor,
a leading portion extending along the corresponding one of the arched sides from one of the apex portions to the recess portion at the leading end, and
a trailing portion extending along the corresponding one of the arched sides from the recess portion at the trailing end to another one of the apex portions;
a bearing support extending between the end faces to support a rotor bearing, the bearing support having a central axis corresponding to a central axis of the rotor; and
a plurality of ribs extending between the end faces from the bearing support to each one of the flanks, the plurality of ribs including, for each flank, a first rib closest to the one of the apex portions and a second rib closest to the other one of the apex portions, the first rib being connected to the flank adjacent a first junction between the leading and recess portions with a distance between the first rib and the first junction being substantially smaller than a distance between the first rib and the one of the apex portions, and the second rib being connected to the flank adjacent a second junction between the recess and leading portions with a distance between the second rib and the second junction being substantially smaller than a distance between the second rib and the other one of the apex portions, wherein at least a portion of each of the first and second ribs defines opposed concave and convex sides and are curved when viewed in a plane perpendicular to the central axis of the rotor.

4. The rotor as defined in claim 3, wherein the first and second ribs of a same one of the flanks are curved in opposite directions.

5. The rotor as defined in claim 3, wherein a cross-section of the portion of each of the first and second ribs extends at least substantially along a respective arc of circle.

6. The rotor as defined in claim 1, wherein the ribs further include, for each flank, at least one intermediate rib extending from the bearing support to the recess portion between the first and second ribs.

7. The rotor as defined in claim 6, wherein the at least one intermediate rib is straight when viewed in a plane perpendicular to the central axis of the rotor.

8. A rotor for a Wankel engine comprising:
two axially spaced apart end faces having a generally triangular profile with outwardly arched sides and three circumferentially spaced apex portions;
a peripheral face extending between the end faces and defining three flanks, each flank extending between two corresponding ones of the apex portions, each flank including a recess in the peripheral face defining part of a combustion chamber;
a rotor bearing support structure extending between the end faces, the support structure having a central axis corresponding to a central axis of the rotor; and
a plurality of ribs extending between the end faces from the support structure to each one of the flanks, the plurality of ribs including, for each flank, a first rib connected to the flank between the recess and one of the corresponding apex portions and a second rib connected to the flank between the recess and the other corresponding one of the apex portions, at least a portion of the first and second ribs of each flank defining opposed concave and convex sides and are curved when viewed in a plane perpendicular to the central axis of the rotor.

9. The rotor as defined in claim 8, wherein for each flank, the first rib is connected to the flank adjacent a leading end of the recess, and the second rib is connected to the flank adjacent a trailing end of the recess, the leading end being located in front of the trailing end with respect to a direction of rotation of the rotor.

10. The rotor as defined in claim 8, wherein the first and second ribs of a same one of the flanks are curved such that the concave sides thereof face one another.

11. The rotor as defined in claim 8, wherein the first and second ribs of a same one of the flanks are curved in opposite directions.

12. The rotor as defined in claim 8, wherein a cross-section of the portion of each of the first and second ribs extends at least substantially along a respective arc of circle.

13. The rotor as defined in claim 8, wherein each flank is free of rib connections between the first rib and the one of the apex portions and between the second rib and the other one of the apex portions.

14. The rotor as defined in claim 8, wherein the ribs include at least one intermediate rib extending from the support structure to a portion of each flank between the first and second ribs.

15. The rotor as defined in claim 14, wherein the at least one intermediate rib is straight when viewed in a plane perpendicular to the central axis of the rotor.

16. A method of reducing pinching of apex seals in a rotor of a Wankel engine having a generally triangular profile with outwardly arched sides defining three flanks each including a recess defining part of a combustion chamber and three circumferentially spaced apex portions interconnecting the flanks, the method comprising:
interconnecting each of the flanks to a bearing support having a central axis corresponding to a central axis of the rotor with a first rib closest to one of the apex portions of the flank and connected to the flank at a first end of the recess defined therein while leaving the one of the apex portions free of rib connections; and
interconnecting each of the flanks to the bearing support with a second rib closest to the other one of the apex portions of the flank and connected to the flank at a second end of the recess defined therein while leaving the other one of the apex portions free of rib connections, wherein at least a portion of each of the first and second ribs defines opposed concave and convex sides and are curved when viewed in a plane perpendicular to the central axis of the rotor.

17. The method as defined in claim 16, further comprising interconnecting each of the flanks to the bearing support with at least one intermediate rib extending between the first and second ribs.

18. The method as defined in claim 16, wherein the first and second ribs are straight when viewed in a plane perpendicular to the central axis of the rotor.

19. The rotor as defined in claim 1, wherein at least a portion of each of the first and second ribs defines opposed concave and convex sides and are curved when viewed in a plane perpendicular to the central axis of the rotor.

* * * * *